Mar. 27, 1923.
W. W. COBLENTZ.
OPTICAL METHOD FOR PRODUCING PULSATING ELECTRIC CURRENT.
FILED AUG. 6, 1920.

1,450,061

Inventor
W. W. Coblentz

Witness
Hayden Roberts

By
Robert H. Young
Attorney

Patented Mar. 27, 1923.

1,450,061

UNITED STATES PATENT OFFICE.

WILLIAM W. COBLENTZ, OF WASHINGTON, DISTRICT OF COLUMBIA.

OPTICAL METHOD FOR PRODUCING PULSATING ELECTRIC CURRENT.

Application filed August 6, 1920. Serial No. 401,747.

*To all whom it may concern:*

Be it known that I, WILLIAM W. COBLENTZ, a citizen of the United States of America, residing at Washington, in the District of Columbia, have invented a certain new and useful Optical Method for Producing Pulsating Electric Current, of which the following is a specification.

The present invention relates to the production of pulsating electric currents, having for its object to provide a new optical method for producing unidirectional pulsating electric current capable of use in any instance where such a current is desirable.

I am aware that heretofore, attempts have been made to produce a pulsating electric current by means of a photo-sensitive selenium cell exposed intermittently to light rays passing through a rotating sectored disc or wheel. Such methods at their best, however, are quite inefficient, since only one-half at most of the incident light is utilized.

My invention involves a principle new in the art to which it pertains, whereby practically all of the useful incident light rays are utilized in producing a rapid change in resistance of an electric circuit and hence, a pulsating electric current in such circuit, this being accomplished by the use of a light reactive resistance consisting of molybdenite, which body possesses the property of increasing in resistance when exposed to light of a certain color and of decreasing in resistance when exposed to light of a different color. By this expression it is meant that in the dark, there is a certain amount of electric conductivity which conductivity is decreased below such value in the dark when exposed to light of wave lengths less than 0.65 micromillimeters, and is greatly increased when exposed to light of wave lengths greater than approximately 0.65 micromillimeters. The total range of change in conductivity thus obtained is greater than that possible by utilizing only the increase in conductivity, such as is obtained by rotating a sectored disc or wheel before an ordinary light reactive substance, such as a selenium cell exposed to light.

It may be noted that for light of wave lengths less than 0.65 micromillimeters, this photo-positive and photo-negative change in conductivity of a light reactive substance such as molybdenite, depends in part upon the voltage applied to the crystal. In some instances, the phenomenon has been found to occur at room temperature at 20 degrees centigrade, while in other cases, the best results are obtained at 100 degrees centigrade. This, of course, is but incidental in this invention.

Instead of using a sectored disc or wheel, such as set out in connection with the above example noted with regards to the selenium cell, this disc or wheel being made out of metal and hence presenting opaque and open surfaces to the incident light, it is possible with my invenion to employ a disc, wheel, film, or other means capable of producing alternately colored light rays, such as red light and green light, the red light increasing the conductivity of the molybdenite light reactive body while the green light decreases conductivity of said light reactive body, this serving to modulate the electric current passing through the body and in this way producing the desired unidirectional pulsating current. The combined effect of alternately exposing the light reactive body or as it may be more aptly termed, the receiver, to the alternately colored radiations, is a greater change in elctrical conductivity than is obtainable by using a metal sector and the ordinary unfiltered light.

In order that the application of my invention may be readily understood by persons skilled in the art, I have in the accompanying illustrative drawings and in the detailed following description pertaining thereto, set out certain practical embodiments of the same.

Figure 1:
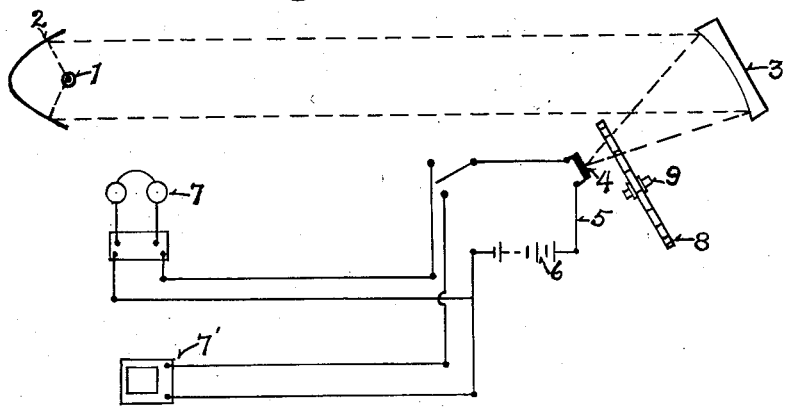
Figure 1 is a schematic view showing the means for accomplishing my optical method of producing pulsating electric current.

Having more particular reference to the drawings, in connection with which like reference characters will designate corresponding parts throughout, in Figure 1, I have shown certain apparatus capable of accomplishing the production, optically, of a unidirectional pulsating electric current, such means comprehending a suitable light source 1 provided with a parabolical or other form of reflector 2, the light rays projected thereby being reflected upon a condensing mirror or lens 3 positioned so as to reflect such light rays onto the light reactive body or receiver 4, composed of molybdenite, as hereinbefore stated. This receiver 4 is interposed in one side of electrical circuit designated at 5 receiving its supply of direct current from a storage battery 6 or other usual source; this circuit 5 being capable of including any form of apparatus to which it is desired to supply a unidirectional pulsating current, such for example, as a radiophonic signaling apparatus 7, or a buzzer relay, etc. (not shown).

As means for alternatley coloring the light rays reflected by the condensing mirror 3 in a manner to effect modulation of the current flowing through said light reactive body or receiver 4 whereby to provide the desired unidirectional pulsating current, I may employ a disc 8 rotatably mounted at 9 in suitable bearings and so positioned with relation to the receiver 4 as to intercept said light rays in their projection onto the same. This disc 8 is provided with circumferentially disposed transparent sectors 10 and 11 of different colors, which colors are such as will cause the alternate increase and decrease in conductivity of the light reactive receiver 4; the sectors, as illustration, being of red and yellow colors, the red serving to increase the conductivity of the receiver 4 when positioned with relation to such receiver to cause the exposing of a red light thereto, while the yellow light will decrease the conductivity of said receiver 4 when exposed thereto so that the light rays will be projected through the same. Hence, it will be understood that when the sectored disc 8 is rapidly rotated, a correspondingly rapid fluctuation or modulation of the current flowing through the light reactive receiver 4 will be effected, thereby producing a unidirectional pulsating current.

Figure 2:
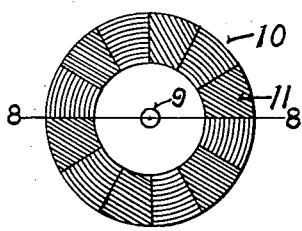
Figure 2 is a detail in side elevation of a form of sectored filter disc or wheel.
Figure 3:
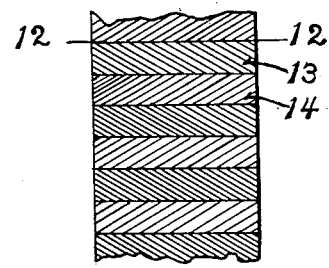
Figure 3 illustrates a modified form of means for alternately coloring the light filtered thereby; and, Figure 4 is a schematic view of a slightly modified form of means for accomplishing optical production of pulsating current in accordance with my invention.

Instead of employing a light coloring or filtering means such as is illustrated by the Figure 2, I may use in lieu thereof, a gelatin film 12, divided into alternately positioned colored panels 13 and 14, such panels being, as illustrated, red and yellow. It may be noted in this connection, however, that other rays may be employed for effecting increase and decrease in conductivity of the molybdenite light reactive receiver 4, such as a spectrum composed of violet, blue, green, greenish yellow, yellow, orange, red, and infra red, or invisible rays; the violet, blue, green, greenish yellow, and yellow rays serving to decrease conductivity of the receiver, while the red and the infra red or invisible rays, will serve to increase its conductivity. The orange color of the spectrum is a neutral point therein and it has been found that its action upon the receiver 4 will be corresponding, that is, neutral thereto.

Figure 4:
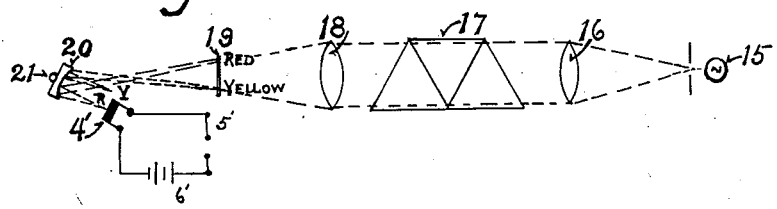

In the Figure 4, another possible and practical embodiment of the invention is disclosed, comprising a light source 15, the rays from which are collimated by the lens 16 of a spectroscope, and dispersed by the prism 17, and then focused into a spectrum 19 by means of the lens 18 of such spectroscope, leaving red and yellow lights, these lights in turn being reflectible upon a mirror 20 mounted for horizontal oscillatory movement as at 21 and adapted to alternately reflect such lights onto a photo-sensitive receiver 4' composed of molybdenite as is the receiver 4. It will thus be understood that when the reflecting mirror 20 is shifted to one position, it will reflect the red light coming from the spectrum 19 onto the receiver 4 and that when the mirror is shifted to its counter position, the yellow light coming from the spectrum 19 will be reflected therefrom onto said receiver 4', effecting modulation of the current passing through such receiver and producing a unidirectional pulsating electric current. The movement of the mirror 20 may be controlled by any suitable mechanism (not shown), such as conditions or preference may dictate.

While I have, throughout this specification, placed considerable stress upon the use of molybdenite as the light reactive substance employed for modulating the electric current, it is to be also understood that various other substances may be substituted therefor, whereby to produce the results sought, for example, stibnite and certain forms of selenium.

It is to be also understood that many other forms of means for producing alternately colored lights projected onto a light reactive body of molybdenite will be substituted for those shown, the underlying principle of my invention involving the modulation of direct electric current by the successive increase and decrease in conductivity of a light reactive body interposed in such direct current circuit to produce unidirectional pulsating electric current of the desired frequency, which frequency may be varied as conditions may dictate, and therefore, such modifications as are within the scope of my claims, I consider within the spirit of my invention.

I claim:

1. Means for producing pulsating electric current, consisting of means for sucessively exposing a light reactive body interposed in an electric circuit to light rays colored to effect alternate photo-positive and photo-negative action by said body whereby to modulate the current pasing therethrough.

2. Means for producing pulsating electric current, consisting of means for successively exposing a light reactive body interposed in an electric circuit to light rays colored to increase and decrease the conductivity of such body whereby to modulate the electric current flowing therethrough.

3. Means for producing a pulsating electric current, consisting of means for alternately exposing in sequential order a light reactive body interposed in an electric circuit to different colored light rays to effect alternate increase and decrease in the conductivity of such body whereby to modulate the electric current passing therethrough.

4. Means for producing a pulsating electric current comprising in combination with a source of light, a condensing mirror from which the light rays emitted by said source are reflected, a light reactive body interposed in an electric circuit, and means positioned between said condensing mirror and light reactive body for alternately changing the color of such light rays to effect increase and decrease in the conductivity of the light reactive body whereby to modulate the electric current passing therethrough.

5. Means for producing a pulsating electric current comprising in combination with a light source, a light reactive body, means for concentrating the light rays emitted by said source and directing the same towards said light reactive body, and filtering means positioned between said light concentrating means and light reactive body for alternately varying the colors of light projected onto the light reactive body whereby to increase and decrease in sequential order the conductivity thereof.

6. Means for producing a pulsating electric current comprising in combination with a light source, a light reactive body, means for directly receiving the light rays emitted by said light source and directing the same towards said light reactive body, the light reactive body being interposed into an electric circuit, and a rotatable disc provided with alternately arranged transparent sectors of different colors positioned between said means for directly receiving the light rays from the light source and the light reactive body adapted to alternately change colors of light rays projected onto the light reactive body for increasing and decreasing its conductivity whereby to modulate the flow of current therethrough to produce a unidirectional pulsating current.

7. Means for producing a pulsating electric current comprising in combination with a source of light, a molybdenite light reactive body, means for directing rays emitted from said source of light towards said light reactive body, and means for intercepting said light rays and alternately coloring the same to increase and decrease in sequential steps the electric conductivity of said light reactive body whereby to modulate the flow of current therethrough.

WILLIAM W. COBLENTZ.